United States Patent [19]

Peru et al.

[11] Patent Number: 5,328,083
[45] Date of Patent: Jul. 12, 1994

[54] INSTALLATION FOR THE CONTINUOUS BUTT JOINING AND WELDING OF AT LEAST TWO SHEET BLANKS BY MEANS OF A LASER BEAM

[75] Inventors: Gilles Peru; Francis Sauvage, both of Dunkerque; Yvon Le Roy, Le Doulieu; Charles Sion, Camphin-en-Carembault, all of France

[73] Assignee: Sollac, Puteaux, France

[21] Appl. No.: 97,027

[22] Filed: Jul. 27, 1993

[30] Foreign Application Priority Data

Aug. 14, 1992 [FR] France .................................. 92 10055

[51] Int. Cl.⁵ ..................... B23K 26/02; B23K 37/047
[52] U.S. Cl. ..................................... 228/5.7; 228/44.3; 228/49.4; 219/121.63; 219/121.82
[58] Field of Search ....................... 228/212, 234.1, 4.1, 228/6.1, 44.3, 49.1, 49.4, 5.7; 219/79, 121.63, 121.82, 158; 164/441, 477

[56] References Cited

U.S. PATENT DOCUMENTS 5,098,005   3/1992   Jack ......................................... 228/4.1
5,229,571   7/1993   Neiheisel ........................... 219/121.63

FOREIGN PATENT DOCUMENTS

0087342   8/1983   European Pat. Off. .
0438615   7/1991   European Pat. Off. .
0483569   5/1992   European Pat. Off. .

Primary Examiner—Samuel M. Heinrich
Attorney, Agent, or Firm—Oblon, Spivak, McClelland, Maier & Neustadt

[57] ABSTRACT

The installation comprises a zone A for positioning a first sheet blank (2) to be welded, a zone B for bringing the two sheet blanks (2, 3) to be welded into edge to edge relation, a zone C for guiding, transferring and welding the two sheet blanks (2, 3), and a zone D for discharging the two welded sheet blanks (2, 3). The invention is applicable to installations for welding by means of a laser beam sheet blanks of different geometrical and/or different thicknesses, for example for the automobile industry.

25 Claims, 5 Drawing Sheets

INSTALLATION FOR THE CONTINUOUS BUTT JOINING AND WELDING OF AT LEAST TWO SHEET BLANKS BY MEANS OF A LASER BEAM

The present invention relates to an installation for the continuous butt joining and welding of at least two sheet blanks by means of a laser beam.

The welding by means of a laser beam of two sheet blanks has opened up considerable industrial possibilities, in particular in the production of butt-welded parts, for example for the automobile industry.

Indeed, two sheet blanks with a butt joint therebetween, i.e. assembled edge to edge without overlapping, and welded by means of a laser beam, fully retain their press-forming capability.

The sheet blanks may have different geometric shapes and/or different thicknesses, and may even be of different grades of steel.

In order to achieve a correct butt joint and weld by means of a laser beam between two sheet blanks in such manner that the press-formability of the welded sheet blanks remains optimum, the sheet blanks to be welded must be disposed with their edges butting against each other without gaps and, in the case of sheet blanks of different shapes, their longitudinal positioning relative to each other must be perfect.

Further, it is essential to ensure, on one hand, a perfect lateral positioning of the sheet blanks so that the joint plane of the two sheets is located on the axis of the laser beam and, on the other hand, a longitudinal and lateral relative positioning of said sheet blanks during their feed so as to maintain the joint plane of said sheets on the axis of the laser beam.

In the case of an industrial installation, the positioning of the sheet blanks must be continuous.

Consequently, an industrial installation must permit the reception of the sheet blanks, the positioning of said sheet blanks relative to each other and relative to the axis of the laser beam during their feed toward the laser beam, then the maintenance of this relative positioning during their feed and the welding of the sheet blanks and their discharge.

An object of the present invention is therefore to provide an installation for the continuous butt joining and welding of at least two sheet blanks by means of a laser beam which results in a good weld quality.

The present invention therefore provides an installation for the continuous butt joining and welding of at least two sheet blanks by means of a laser beam, characterized in that it comprises:

A) a first zone for positioning the first sheet blank to be welded, comprising:

a device for feeding said sheet blank on means for supporting and longitudinally positioning said sheet blank in a horizontal reference plane and horizontally movable in the direction toward said laser beam, means for laterally positioning the edge to be welded of said sheet blank on the axis of the laser beam, means for maintaining the longitudinal and lateral relative positioning of said sheet blank, and means for maintaining the edge to be welded of said sheet blank on the axis of the laser beam, B) a second zone for making a butt joint between the two sheet blanks to be welded, comprising:

longitudinal means for supporting the first sheet blank in a horizontal reference plane, means for maintaining the longitudinal and lateral relative positioning of the first sheet blank, means for maintaining the edge to be welded of the first sheet blank on the axis of the laser beam, a device for feeding the second sheet blank on longitudinal means for supporting the second sheet blank in a reference plane and positioning the edge to be welded of the second sheet blank against the edge to be welded of the first sheet blank, horizontally movable in synchronism with said means for maintaining the longitudinal and lateral relative positioning of the first sheet blank, and means for maintaining a longitudinal and lateral relative positioning of the second sheet blank, C) a third zone for guiding, transferring and welding the two sheet blanks, comprising:

longitudinal means for supporting the sheet blanks in a horizontal reference plane, means for maintaining a longitudinal and lateral relative positioning of the two sheet blanks and horizontally movable, means for maintaining the edge to be welded of the first sheet blank on the axis of the laser beam, means for producing a lateral pressure between the edges to be welded of the two sheet blanks, and a laser beam welding unit, D) a fourth zone for discharging the two welded sheet blanks, comprising longitudinal means for supporting said welded sheet blanks and means for removing said welded sheet blanks.

Features and advantages of the present invention will be apparent from the following description which is given solely by way of example with reference to the accompanying drawings, in which.

Figure 1:
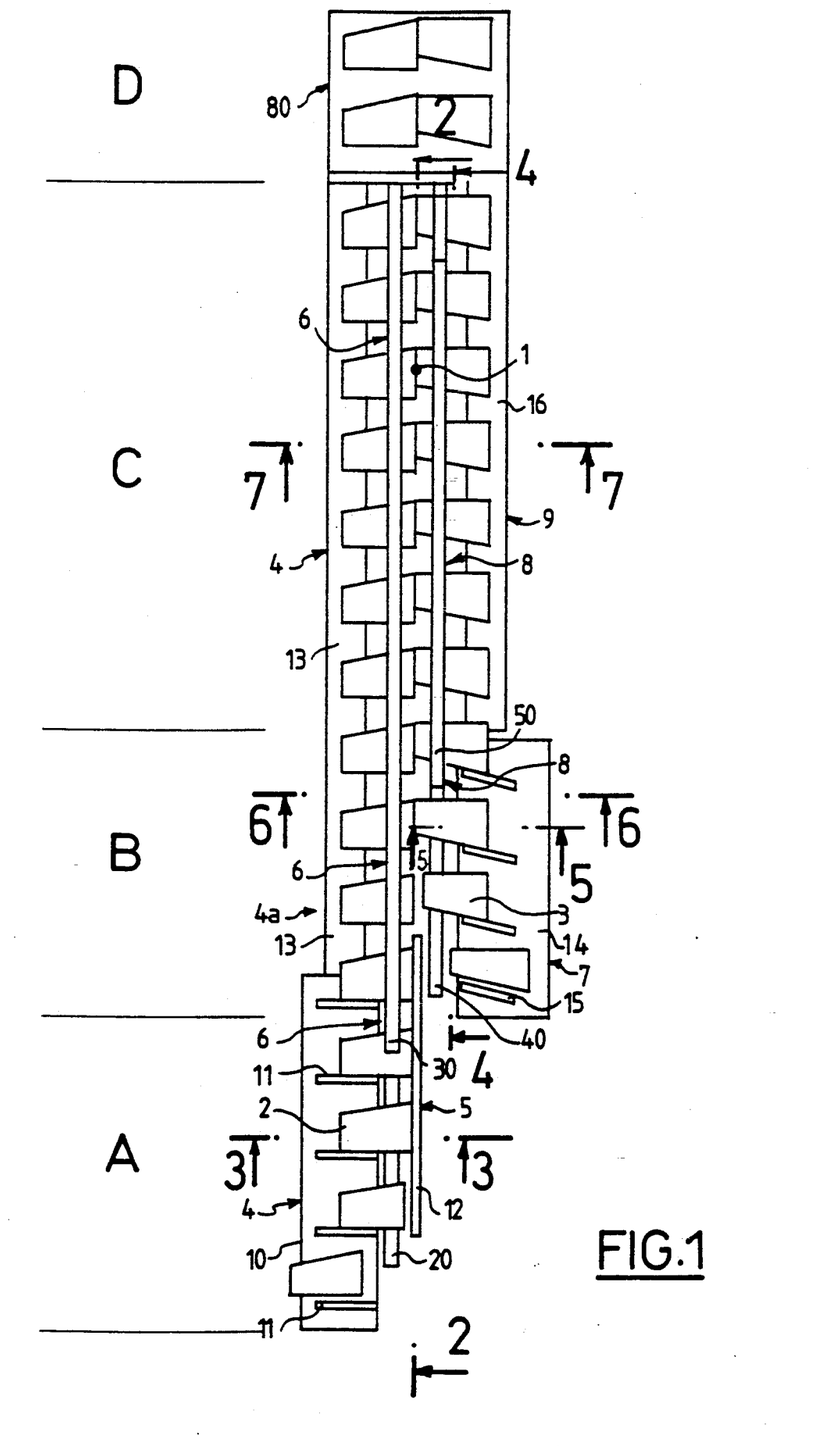
FIG. 1 is a diagrammatic top plan view of an installation according to the invention.

The installation diagrammatically illustrated in FIG. 1 is adapted for the continuous butt joining and welding by means of a laser beam 1 and in succession a plurality of pairs of sheet blanks 2 and 3 having different geometric shapes and/or different thicknesses, for example for the automobile industry.

The two sheet blanks 2 and 3 of each pair are fed edge to edge and continuously travel under the laser beam I for the purpose of welding these blanks.

For this purpose, the installation shown in FIG. 1 comprises, following on means for blanking out the sheet blanks 2 and 3:

A) a zone A for positioning the first sheet blank 2 to be welded,

B) a zone B for bringing the two sheet blanks 2 and 3 to be welded into edge to edge relation, C) a zone C for guiding, transferring and welding the two sheet blanks 2 and 3, and D) a zone D for discharging the two welded blank sheets 2 and 3.

In order to guarantee a high weld quality, the positioning of the sheet blanks 2 and 3 must satisfy in the welding zone C several requirements which are in particular the positions of the edges to be welded relative to each other and relative to the axis of the laser beam 1, and the relative pressure exerted on said edges so as to control, and even reduce, the gap between said edges in the course of the feeding of the sheet blanks 2 and 3.

The zone A comprises:

a device for feeding the first sheet blank 2 on means 4 for supporting and longitudinally positioning said sheet blank 2 in a horizontal reference plane, said means being movable horizontally in the direction toward the laser beam 1, means 5 for laterally positioning the edge to be welded of the sheet blank 2 on the axis of the laser beam 1, means 6 for maintaining a longitudinal and lateral relative positioning of the sheet blank 2, and means 60 for maintaining the edge to be welded of the sheet blank 2 on the axis of the laser beam 1.

In the embodiment shown in FIG. 1, the means 4 for supporting and longitudinally positioning the sheet blank 2 comprise a conveyor belt 10, in particular a ball belt, constituting a first surface of continuous contact with the lower face of the sheet blank 2.

This conveyor belt 10 is in juxtaposed relation to a lower chain 20 carrying articulated shoes constituting a second surface of continuous contact with the lower face of the first sheet blank 2 and moving longitudinally in synchronism with said conveyor belt 10.

The lower articulated shoe chain 20 supports a part of the first sheet blank 2 located in the vicinity of the edge to be welded and the conveyor belt 10 supports the other part of the first sheet blank 2.

The conveyor belt 10 is provided with means for geometrically positioning each first sheet blank 2 which are disposed and adapted in accordance with the shape or the geometrical profile of the corresponding first sheet blank 2.

These means may be constituted by abutments in the form of bars, lugs, sloping elements, pins or any other known means for positioning a part on a conveyor belt.

In the embodiment shown in FIG. 1, these means are formed by bars 11 fixed to the conveyor belt 10 and moving with the latter.

Figure 3:
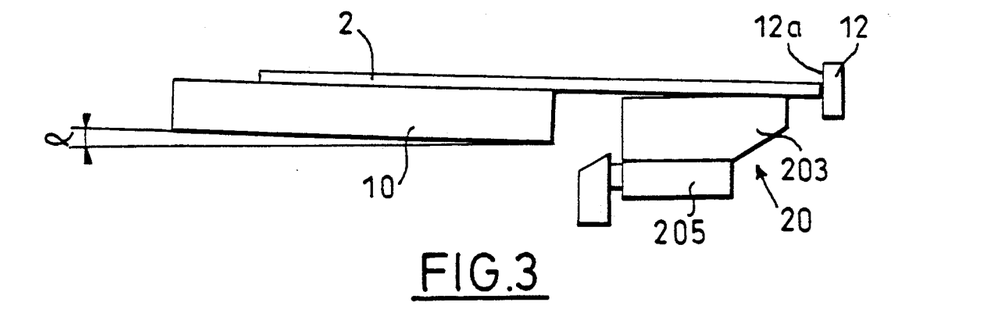
FIG. 3 is a sectional view taken on line 3—3 of FIG. 1.

As shown in FIGS. 1 and 3, in the zone A, the means for laterally positioning the edge to be welded of the first sheet blank 2 are formed by a longitudinally extending stop 12 constituting a guide disposed vertically so that the plane containing its lateral surface 12a in facing relation to the lower articulated shoe chain 20 coincides with the axis of the laser beam 1.

As shown in FIG. 3, the conveyor belt 10 is inclined relative to the horizontal in the direction toward the lower articulated shoe chain 20 at an angle α between 1 and 5°, this inclination decreasing in the direction of displacement of the first sheet blank 2 from this angle α down to 0°, the conveyor belt 10 then being perfectly horizontal. This conveyor belt 10 is horizontal before reaching the means 6 for maintaining a longitudinal and lateral relative positioning of the first sheet blank 2.

The means 6 for maintaining a longitudinal and lateral relative positioning of the first sheet blank 2 in the zone A are formed by an input end portion of an upper chain 30 having articulated shoes constituting a surface of continuous contact with the upper face of said first sheet blank 2.

The upper articulated shoe chain 30 is disposed in facing relation to the corresponding lower articulated shoe chain 20 and is adapted to cooperate with the latter for displacing the first sheet blank 2 by adherence.

Thus, the sheet blanks 2 placed on the conveyor belt 10 —which for example has rotatable balls—by suitable means (not shown), such as for example a handling robot, are displaced longitudinally by the bars 11 and slide laterally on the conveyor belt 10 in such manner that the edge to be welded of each sheet blank 2 comes into contact with the lateral surface 12a of the stop 12 and is thus positioned on the axis of the laser beam 1. At the end of the zone A, the sheet blanks 2 are maintained in position relative to one another by the upper articulated shoe chain 30.

The lower articulated shoe chain 20 and the upper articulated shoe chain 30 will be described in more detail hereinafter.

The zone B for bringing the two sheet blanks 2 and 3 to be welded in edge to edge or butting relation comprises:

longitudinal means 4a for supporting the first sheet blank 2 in a horizontal reference plane, means 6 for maintaining in a longitudinal and lateral relative positioning of the first sheet blank 2, means 60 for maintaining the edge to be welded of the first sheet blank 2 on the axis of the laser beam 1, a device for feeding the second sheet blank 3 on means 7 for longitudinally supporting the second sheet blank 3 in a reference plane and positioning the edge to be welded of the second sheet blank 3 against the edge to be welded of the first sheet blank 2, said means being movable horizontally and in synchronism with said means 6 for maintaining the longitudinal and lateral relative positioning of the first sheet blank 2, and means 8 for maintaining a longitudinal and lateral relative positioning of the second sheet blank 3.

The means 4a for longitudinally supporting the first sheet blank 2 in the zone B are formed by a horizontal conveyor belt 13 constituting a first surface of continuous contact with the lower face of the first sheet blank 2.

This horizontal conveyor belt 13 is in juxtaposed relation to the lower articulated shoe chain 20 of the zone A, extending in the zone B and constituting a second surface of continuous contact with the lower face of the first sheet blank 2.

The horizontal conveyor belt 13 is for example a belt having freely rotatable rollers or a belt having balls, or it may be a rolling belt which moves longitudinally in synchronism with the lower articulated shoe chain 20.

The lower articulated shoe chain 20 supports a part of the first sheet blank 2 located ]In the vicinity of the edge to be welded and the horizontal conveyor belt 13 supports the other part of the first sheet blank 2.

In this zone B, the means 6 for maintaining the longitudinal and lateral relative positioning of the first sheet blank 2 are also constituted by the upper articulated shoe chain 30 of the zone A constituting a surface of continuous contact with the upper face of the first sheet blank 2.

The upper articulated shoe chain 30 is located in facing relation to the lower articulated shoe chain 20 and is adapted to cooperate with the latter so as to feed the first sheet blank 2 by adherence, as occurs in the zone A.

In the zone B, the means 7 for supporting and longitudinally positioning the second sheet blank 3 are constituted by a conveyor belt 14, for example having balls, constituting a first surface of continuous contact with the lower face of the second sheet blank 3.

This conveyor belt 14 is in juxtaposed relation to a lower articulated shoe chain 40 constituting a second surface of continuous contact with the lower face of the second sheet blank 3 and moving longitudinally in synchronism with the conveyor belt 14.

The lower articulated shoe chain 40 supports a part of the second sheet blank 3 located in the vicinity of the edge to be welded and the conveyor belt 14 supports the other part of the second sheet blank 3.

The conveyor belt 14 is provided with means for geometrically positioning the second sheet blank 3 which are disposed relative to and adapted to the shape and the profile of the second sheet blank 3.

These means may be formed by stops in the form of bars, lugs, sloping elements, pins or any other known means for positioning a part on a conveyor belt.

In the embodiment shown in FIG. 1, these means are formed by bars 15 fixed to the conveyor belt 14 and moving with the latter.

Figure 5:
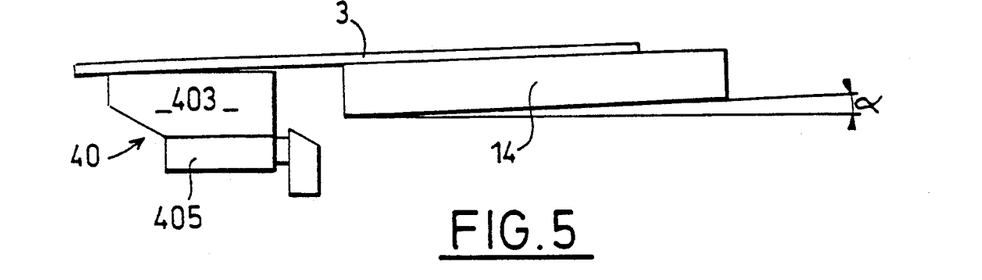
FIG. 5 is a sectional view taken on line 5—5 of FIG. 1.

As shown in FIG. 5, the conveyor belt 14, for example having balls, is inclined to the horizontal in the direction toward the lower articulated shoe chain 40 at an angle $\alpha$ of between 1 and 5° which decreases in the direction of displacement of the second sheet blank 3, from this angle $\alpha$ down to 0° where the conveyor belt 14 is then perfectly horizontal. The conveyor belt 14 is horizontal before reaching the means 8 for maintaining the longitudinal and lateral relative positioning of the second sheet blank 3.

In the zone B, the means 8 for maintaining the longitudinal and lateral relative positioning of the second sheet blank 3 are constituted by an upper articulated shoe chain 50 constituting a surface of continuous contact with the upper face of the second sheet blank 3.

The upper articulated shoe chain 50 is disposed in facing relation to the lower articulated shoe chain 40 and is adapted to cooperate with the latter so as to feed the second sheet blank 3 by adherence or friction.

Thus, the sheet blanks 3 placed on the conveyor belt 14 by suitable means (not shown), such as for example a handling robot, are displaced by the bars 15 and slide laterally on the conveyor belt 14 in such manner that the edge to be welded of each second sheet blank 3 comes into contact with the edge to be welded of each first sheet blank 2 and is consequently positioned on the axis of the laser beam 1. At the end of the zone B, the sheet blanks 3 are maintained in their relative positioning by the upper articulated shoe chain 50.

The lower articulated shoe chain 40 and the upper articulated shoe chain 50 will be described in more detail hereinafter.

The zone C for guiding, transferring and welding the two sheet blanks 2 and 3 comprises:

longitudinal means 4a for supporting the first sheet blank 2 in a horizontal reference plane, means 6 for maintaining a longitudinal and lateral relative positioning of the first sheet blank 2 and horizontally movable, means 9 for longitudinally supporting the second sheet blank 3 in a horizontal reference plane and movable in the direction toward the laser beam 1, means 8 for maintaining the longitudinal and lateral relative positioning of the second sheet blank 3 and movable horizontally, means 6 for maintaining the edge to be welded of the first sheet blank on the axis of the laser beam 1, means 70 for producing a lateral pressure between the edges to be welded of the two sheet blanks 2 and 3, and the laser beam 1.

This zone C may also include means for controlling the gap between the two sheet blanks upstream of the laser beam 1 relative to the direction of displacement of the sheet blanks.

The longitudinal means 4a for supporting the first sheet blank 2 in the zone C are constituted by the horizontal conveyor belt 13 and the lower articulated shoe chain 20 of the zone B which extends into the zone C.

The means 6 for maintaining the longitudinal and lateral relative positioning of the first sheet blank 2 are constituted by the upper chain 30 of the zone B which extends into the zone C and is adapted to cooperate with the lower articulated shoe chain 20 so as to feed the first sheet blank 2 by adherence.

The longitudinal means for supporting the second sheet blank 3 of the zone C are formed by a horizontal conveyor belt 16 constituting a first surface of continuous contact with the lower face of the second sheet blank 3.

The horizontal conveyor belt 16 is in juxtaposed relation to the lower articulated shoe chain 40 of the zone B and extends into the zone C and constitutes a second surface of continuous contact with the lower face of the second sheet blank 3.

The horizontal conveyor belt 16 is for example a belt having rollers mounted to be freely rotatable or a belt having balls or it may be a rolling belt moving longitudinally in synchronism with the lower articulated shoe chain 40.

The lower articulated shoe chain 40 supports a part of the second sheet blank 3 located in the vicinity of the edge to be welded and the conveyor belt 16 supports the other part of the second sheet blank 3.

The conveyor belts 10, 14 and the articulated shoe chains 20, 30, 40, 50 move longitudinally in synchronism with one another and possibly with the conveyor belts 13 and 16 in the case where they are formed by rolling belts.

Further, the conveyor belts 10 and 13 and the chains 20 and 30 cooperating with the first sheet blank 2, and the conveyor belts 14 and 16 and the chains 40 nd 50 cooperating with the second sheet blank 3 are located on each side of the butt joint plane of the sheet blanks 2 and 3.

During its transfer to the zone B, the first sheet blank 2 rests first of all on the conveyor belt 10, and is then pressed between the lower articulated shoe chain 20 and the input portion of the upper articulated shoe chain 30.

The same is true in respect of the transfer to the zone C of the second sheet blank 3 which first of all rests on the conveyor belt 14 and on the lower articulated shoe chain 40, and is then pressed between the lower chain 40 and the input portion of the upper articulated shoe chain 50.

In order to ensure the relative positioning of the two sheet blanks 2 and 3 in the direction toward the laser beam 1, the means 4 for supporting and positioning the first sheet blank 2 and the means 7 for supporting and positioning the second sheet blank 3 may be put out of synchronism so that they travel at different speeds until the two conveyor belts 10 and 14 are in the correct position relative to each other so that the sheet blanks 2 and 3 arrive perfectly positioned in the zone C of the installation.

With reference now to FIGS. 2, 4 and 6 to 9, the articulated shoe chains will be described in more detail.

Figure 2:
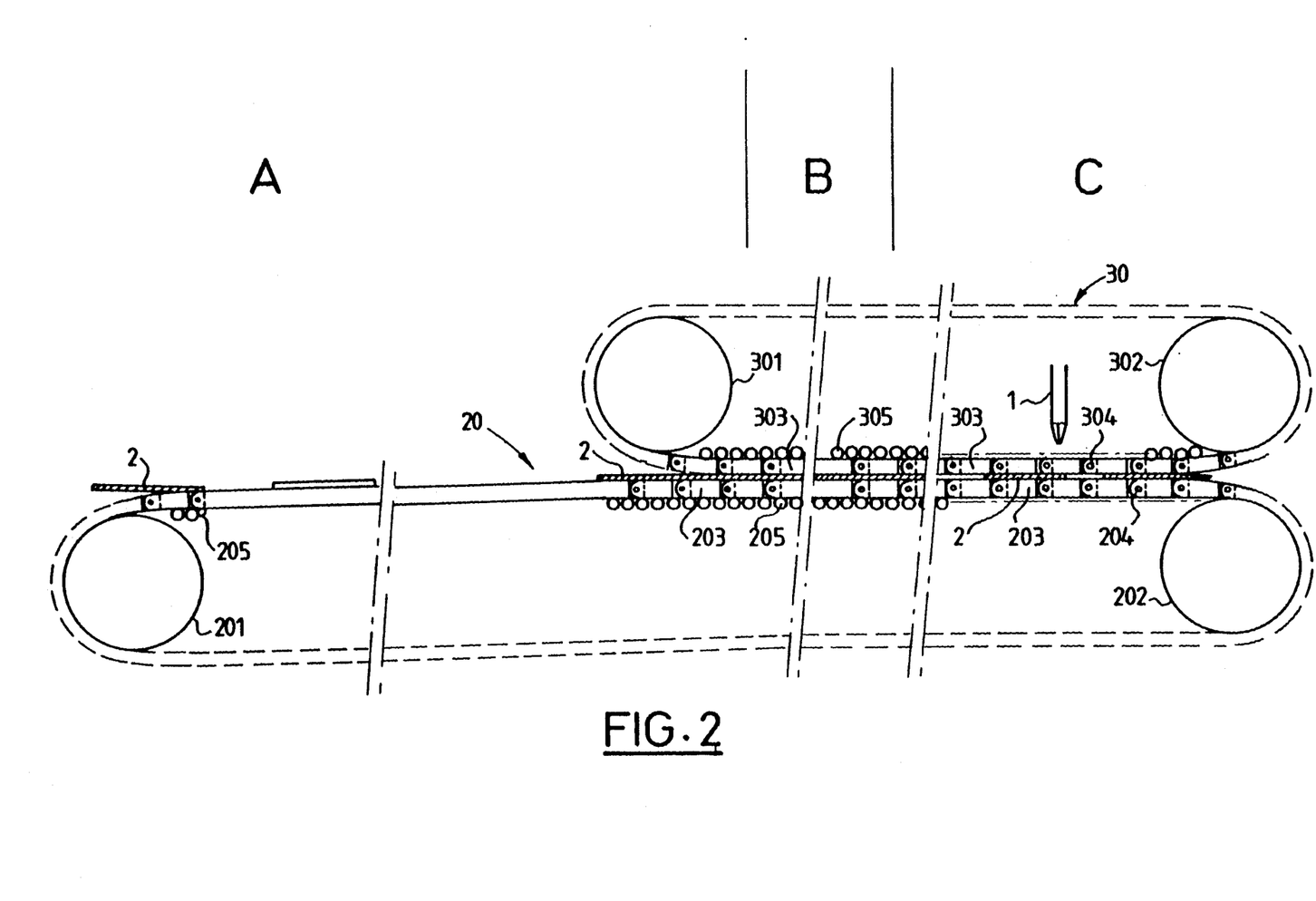
FIG. 2 is a diagrammatic sectional view taken on line 2—2 of FIG. 1.
Figure 6:
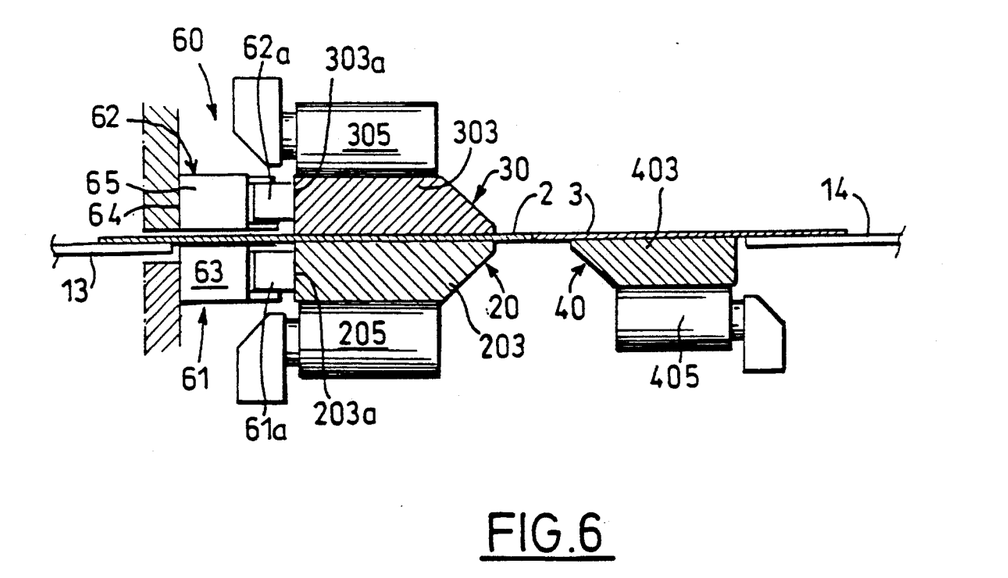
FIG. 6 is a sectional view taken on line 6—6 of FIG. 1.
Figure 7:
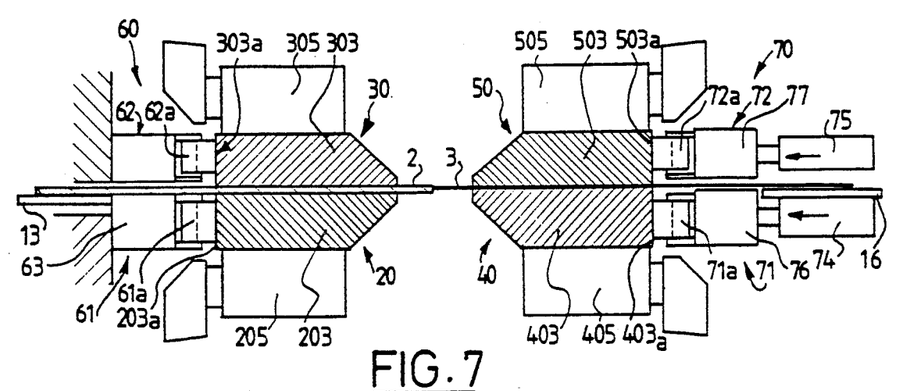
FIG. 7 is a sectional view taken on line 7—7 of FIG. 1.

As shown in FIGS. 2, 6 and 7, the lower articulated shoe chain 20, which constitutes a surface of continuous contact with the lower face of the sheet blank 2, forms a closed loop in a plane perpendicular to the sheet blanks 2 and 3.

The lower chain 20 is carried by a pair of wheels 201 and 202 each disposed at a respective end of the loop.

Figure 8:
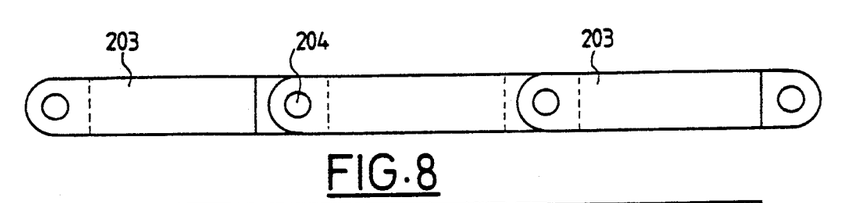
FIG. 8 is a diagrammatic elevational view of several shoes of a chain carrying articulated shoes.
Figure 9:
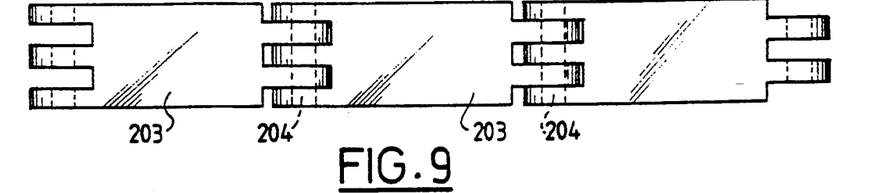
FIG. 9 is a top plan view of the shoes of FIG. 8.

The lower chain 20 comprises shoes 203 which have a parallel-sided shape and are articulated together by means of spindles 204 as shown in FIGS. 8 and 9.

The lower chain 20 also includes support rollers 205 which are freely rotatable and adapted to cooperate with the face of the shoes 203 opposite to that in contact with the second sheet blank 2.

These cylindrical rollers 205 having a rectilinear generatrix, are relatively close together, the axis of rotation of said rollers being perpendicular to the direction of travel of the lower and horizontal chain 20.

These rollers 205 support the lower chain 20 in such manner that the surface of the chain 20 in contact with the lower face of the second sheet blank 2 defines a horizontal reference plane for the positioning of this blank.

At least three rollers 205 are in contact with each shoe 203.

The lower chain 20 is for example driven by a motor-speed reducer system (not shown) connected to one of the wheels 201 or 202.

The upper articulated shoe chain 30, which forms a surface of continuous contact with the upper face of the first sheet blank 2, constitutes a closed loop in a plane perpendicular to the sheet blanks 2 and 3.

The upper chain 30 is carried by a pair of wheels 301 and 302 each disposed at a respective end of the loop.

The upper chain 30 is constituted by shoes 303 which have a generally parallel-sided shape and are articulated together by means of spindles 304.

The upper chain 30 includes support rollers 305 which are freely rotatable and adapted to cooperate with the face of the shoes 303 opposite to that in contact with the first sheet blank 2.

These cylindrical rollers 305 having a rectilinear generatrix are relatively close to each other, the axis of rotation of said rollers being perpendicular to the direction of travel of the upper and horizontal chain 30.

The upper chain 30 is driven for example by a motor-speed reducer system (not shown) connected to one of the wheels 301 or 302.

The rollers 305 are so positioned that they exert a vertically downward surface pressure on the shoes 303 of the upper chain 30 and thereby pinch the first sheet blank 2 between the shoes 203 and 303.

At least three rollers 305 are in contact with each shoe 303 in evenly spaced apart regions so that the force of compression exerted on the first sheet blank 2 is so distributed as to maintain a good flatness of the shoes 303 and permit a distribution of the compressive force by several linear contacts.

Figure 4:
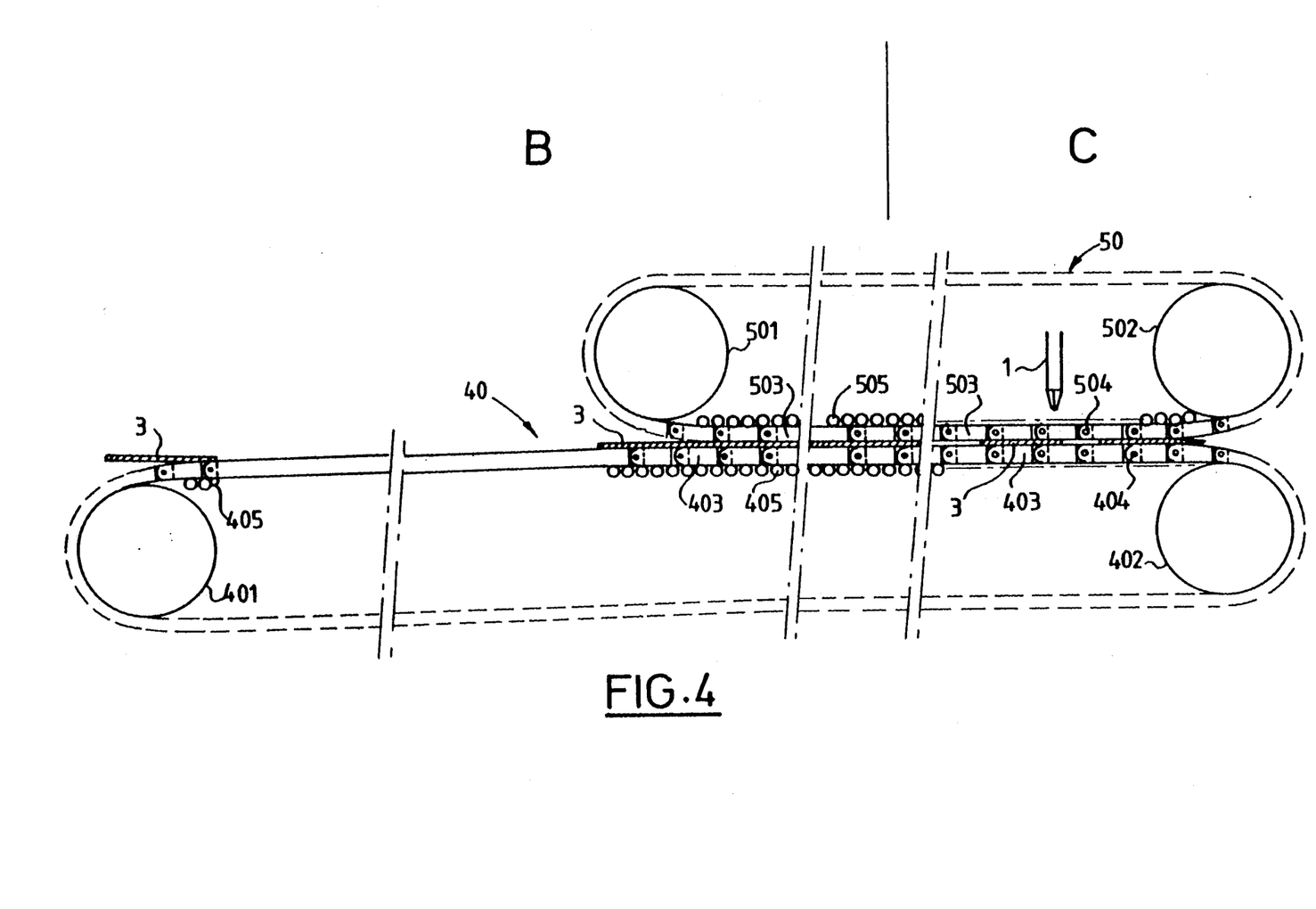
FIG. 4 is a sectional view taken on line 4—4 of FIG. 1.

As shown in FIGS. 4, 6 and 7, the lower articulated shoe chain 40, which constitutes a surface of continuous contact with the lower face of the second sheet blank 3, forms a closed loop in a plane perpendicular to the sheet blanks 2 and 3.

The lower articulated shoe chain 40 is carried by a pair of wheels 401 and 402 each disposed at a respective end of the loop.

The lower chain 40 comprises shoes 403 which have a generally parallel-sided shape and are articulated together by spindles 404.

The lower chain 40 comprises support rollers 405 which are freely rotatable and adapted to cooperate with the face of the shoes 403 opposite to that in contact with the second sheet blank 3.

The cylindrical rollers 405 having a rectilinear generatrix are relatively close to each other, the axis of rotation of said rollers being perpendicular to the direction of travel of the lower and horizontal chain 40.

The rollers 405 support the lower chain 40 so that the surface of the lower chain 40 in contact with the lower face of the second sheet blank 3 defines a horizontal reference plane for the positioning of the sheet blank.

At least three rollers 405 are in contact with each shoe 403.

The lower chain 40 is driven for example by a motor-speed reducer system (not shown) connected to one of the wheels 401 or 402.

The upper articulated shoe chain 50, which constitutes a surface of continuous contact with the upper face of the second sheet blank 3, forms a closed loop in a plane perpendicular to the sheet blanks 2 and 3.

The upper chain 50 is carried by a pair of wheels 501 and 502 each disposed at a respective end of the loop.

The upper chain 50 comprises shoes 503 which have a generally parallel-sided shape and are articulated together by spindles 504.

The upper chain 50 comprises support rollers 505 which are freely rotatable and adapted to cooperate with the face of the shoes 503 opposite to that in contact with the second sheet blank 3.

These rollers 505 having a rectilinear generatrix are relatively close to each other, the axis of rotation of the rollers being perpendicular to the direction of travel of the horizontal and upper chain 50.

The upper chain 50 is driven for example by a motor-speed reducer system (not shown) connected to one of the wheels 501 and 502.

The support rollers 505 are so positioned as to exert a vertical surface pressure on the shoes 503 of the upper chain 50 and thereby press the second sheet blank 3 between the shoes 403 and 503.

At least three rollers 505 are in contact with each shoe 503 in equally spaced apart regions so that the compression force is distributed over the second sheet blank 3, thereby maintaining a good flatness of the shoes 503 and distributing the force over a plurality of linear contacts.

Each sheet blank 2 or 3, after having been progressively pinched between the shoes respectively 203 and 303, 403 and 503, in the zones A and B of the installation, are guided and fed by adherence into the zone C between these shoes owing to the surface pressure exerted by the rollers, respectively 205 and 305, 405 and 505.

The articulated shoe chains 20, 30, 40 and 50 are driven in synchronism with one another so as to feed the sheet blanks 2 and 3 in the direction for welding with no slip being possible between the sheet blanks and the shoes put under pressure.

The end of the zone A and the zones B and C are provided with means 60 for maintaining the edge to be welded of the first sheet blank 2 on the axis of the laser beam 1.

As shown in FIGS. 6 and 7, these means 60 for maintaining in position the edge to be welded of the first sheet blank 2 are formed by two lateral guideways 61 and 62 which are parallel and disposed on each side of the horizontal plane of the feeding of the sheet blanks 2 and 3.

The guideway 61 is constituted by rollers 61a which have a vertical axis and are freely rotatable, the rollers 61a bearing against the lateral surface 203a of the shoes 203 of the lower chain 20 and being mounted on a support 63 fixed to a vertical reference surface 64.

The guideway 62 is also constituted by rollers 62a having a vertical axis and freely rotatable, the rollers 62a bearing against the lateral surface 303a of he shoes 303 of the upper chain 30 and being mounted on a support 65 fixed on the vertical reference surface 64.

In an alternative embodiment, the rollers 61a and 62a may be directly mounted on the respective shoes 203 and 303 and bear against the vertical reference surface 64.

This arrangement permits, owing to the guideways 61 and 62 and the reference surface 64, maintaining the edge to be welded of the first sheet blank 2, previously positioned in the zone A of the installation, on the axis of the laser beam 1.

The end of the zone B and the zone C are provided with means 70 for producing a lateral pressure between the edges to be welded of the two sheet blanks 2 and 3.

As shown in FIG. 7, these means 70 for producing a lateral pressure on the edges to be welded of the two sheet blanks 2 and 3 are constituted by two lateral and parallel guideways 71 and 72 located on each side of the horizontal plane of the feeding of the sheet blanks.

The guideway 71 cooperates, on one hand, with the shoes 403 of the lower chain 40 and, on the other hand, with at least one pusher element 74 in a direction perpendicular to the joint plane of the sheet blanks 2 and 3.

The guideway 72 cooperates, on one hand, with the shoes 503 of the upper chain 50 and, on the other hand, with at least one pusher element 75 in a direction perpendicular to the joint plane of the sheet blanks 2 and 3.

The guideway 71 comprises rollers 71a which have a vertical axis and are freely rotatable, the rollers 71a bearing against the lateral surface 403a of the shoes 403 of the lower chain 40 and being mounted on a support 76 connected to the pusher element 74.

The guideway 72 is constituted by rollers 72a which have a vertical axis and are freely rotatable, the rollers 72a bearing against the lateral surface 503a of the shoes 503 of the upper chain 50 and being mounted on a support 77 connected to the pusher element 75.

In an alternative embodiment, the rollers 71a and 72a may be directly mounted on the respective shoes 403 and 503 and may bear against a guide connected to the pusher elements 74 and 75.

The pusher elements 74 and 75 are constituted for example by jacks or cylinder devices.

In an alternative embodiment, the means for maintaining the longitudinal and lateral relative positioning of the sheet blanks 2 and 3 may be formed by a continuous strip in contact with the upper face of the corresponding sheet blank 2 or 3 and by freely rotatable rollers urging the continuous strip against this upper face.

The zone D for discharging the two welded sheet blanks comprises means 80 for supporting the welded sheet blanks and means (not shown) for removing the welded sheet blanks.

The support means 80 may be constituted by a transfer table, for example a table having rollers or balls, and the removing means may be constituted by a handling robot.

The means 80 for supporting the welded sheet blanks may also be constituted by the conveyor belts 13 and 16 and the lower chains 20 and 40 of the preceding zone C which are extended into the zone D.

The zone D may also include means for inspecting, brushing and oiling the weld.

What is claimed is:

1. Installation for the continuous butt joining and welding of edges of at least two sheet blanks by means of a laser beam, characterized in that said installation comprises in combination:

a first zone for positioning a first sheet blank of said at least two sheet blanks to be welded comprising in combination:

a device for feeding said first sheet blank longitudinally of said installation toward said laser beam and including means for supporting and longitudinally positioning said sheet blank in a horizontal reference plane and movable horizontally in a direction toward said laser beam, means for laterally positioning an edge to be welded of said first sheet blank on an axis of said laser beam, means for maintaining a longitudinal and lateral relative positioning of said first sheet blank, and means for maintaining said edge to be welded of said first sheet blank on said axis of said laser beam;

a second zone for making a butt joint between edges of said at least two sheet blanks to be welded and comprising in combination:

longitudinal means for supporting said first sheet blank in a horizontal reference plane, means for maintaining a longitudinal and lateral relative positioning of said first sheet blank, means for maintaining said edge to be welded of said first sheet blank on said axis of said laser beam, a device for feeding a second sheet blank of said at least two sheet blanks and including longitudinal means for supporting said second sheet blank in a horizontal reference plane and positioning an edge to be welded of said second sheet blank against said edge to be welded of said first sheet blank and horizontally movable in synchronism with said means for maintaining said longitudinal and lateral relative positioning of said first sheet blank, and means for maintaining a longitudinal and lateral relative positioning of said second sheet blank;

a third zone for guiding, transferring and welding said edges of said first and second sheet blanks, comprising in combination:

longitudinal means for supporting said first and second sheet blanks in a horizontal reference plane, means for maintaining a longitudinal and lateral relative positioning of said first and second sheet blanks and horizontally movable, means for maintaining said edge to be welded of said first sheet blank on said axis of said laser beam, means for producing a lateral pressure between said edges to be welded of said first and second sheet blanks, and a laser beam welding unit;

a fourth zone for discharging the welded first and second sheet blanks, comprising longitudinal means for supporting said welded sheet blanks and means for removing said welded sheet blanks.

2. Installation according to claim 1, wherein said means for supporting and longitudinally positioning said first sheet blank comprise a conveyor belt constituting a first surface of continuous contact with a lower face of said first sheet blank, and a lower chain in juxtaposed relation to said conveyor belt and including articulated shoes constituting a second surface of continuous contact with said lower face of said first sheet blank and moving longitudinally in synchronism with said conveyor belt.

3. Installation according to claim 2, wherein said lower articulated shoe chain supports one part of said first sheet blank located in the vicinity of said edge to be welded and said conveyor belt supports another part of said first sheet blank.

4. Installation according to claim 2, wherein said means for laterally positioning said edge to be welded of said first sheet blank comprise a longitudinal stop acting as a guide and disposed vertically so that a plane containing a lateral surface thereof in facing relation to said lower articulated shoe chain is coincident with said axis of said laser beam.

5. Installation according to claim 1, wherein said means for supporting and longitudinally positioning said second sheet blank comprise a second conveyor belt constituting a first surface of continuous contact with a lower face of said second sheet blank, and a lower chain in juxtaposed relation to said second conveyor belt and including articulated shoes constituting a second surface of continuous contact with said lower face of said second sheet blank and moving longitudinally in synchronism with said second conveyor belt.

6. Installation according to claim 5, wherein said lower articulated shoe chain supports one part of said second sheet blank located in the vicinity of said edge to be welded of said second sheet blank and said second conveyor belt supports another part of said second sheet blank.

7. Installation according to claim 2, wherein said means for supporting and longitudinally positioning said second sheet blank comprise a second conveyor belt constituting a first surface of continuous contact with a lower face of said second sheet blank, and a lower chain in juxtaposed relation to said second conveyor belt and including articulated shoes constituting a second surface of continuous contact with said lower face of said second sheet blank and moving longitudinally in synchronism with said second conveyor belt, said conveyor belts being provided with means for geometrically positioning each respective sheet blank and adapted to the shape of the respective sheet blank.

8. Installation according to claim 7, wherein said means for geometrically positioning each sheet blank comprise stops.

9. Installation according to claim 2, wherein said means for supporting and longitudinally positioning said second sheet blank comprise a second conveyor belt constituting a first surface of continuous contact with a lower face of said second sheet blank, and a lower chain in juxtaposed relation to said second conveyor belt and including articulated shoes constituting a second surface of continuous contact with said lower face of said second sheet blank and moving longitudinally in synchronism with said second conveyor belt, said conveyor belts being inclined to the horizontal in a direction toward the corresponding lower articulated shoe chain at an angle of 1 to 5° which decreases in the direction of feed of said sheet blanks from said angle down to 0°, said conveyor belts having horizontal position before reaching said means for maintaining the relative positioning of said sheet blanks.

10. Installation according to claim 2, wherein said means for supporting and longitudinally positioning said second sheet blank comprise a second conveyor belt constituting a first surface of continuous contact with a lower face of said second sheet blank, and a lower chain in juxtaposed relation to said second conveyor belt and including articulated shoes constituting a second surface of continuous contact with said lower face of said second sheet blank and moving longitudinally in synchronism with said second conveyor belt, said conveyor belts being provided with balls.

11. Installation according to claim 2, wherein said longitudinal means for supporting said first sheet blank in said second zone and said third zone of said installation comprise a horizontal conveyor belt, constituting a first surface of continuous contact with said lower face of said first sheet blank, in juxtaposed relation to said lower articulated shoe chain of said first zone extending into said second zone and said third zone and constituting a second surface of continuous contact with said lower face of said first sheet blank.

12. Installation according to claim 5, wherein said longitudinal means for supporting said second sheet blank in said third zone of said installation comprise a horizontal conveyor belt, constituting a first surface of continuous contact with said lower face of said second sheet blank, in juxtaposed relation to said lower articulated shoe chain of said second zone extending into said third zone and constituting a second surface of continuous contact with said lower face of said second sheet blank.

13. Installation according to claim 2, wherein said means for maintaining said relative longitudinal and lateral positioning of said first sheet blank comprise an upper chain including articulated shoes constituting a surface of continuous contact with said upper face of said first sheet blank, said upper articulated shoe chain being disposed in facing relation to said lower articulated shoe chain and cooperative with said lower articulated shoe chain for the purpose of feeding said first sheet blank by adherence.

14. Installation according to claim 13, wherein said upper articulated shoe chain travels longitudinally in synchronism with said lower articulated shoe chain.

15. Installation according to claim 5, wherein said means for maintaining said longitudinal and lateral relative positioning of said second sheet blank comprise an upper chain including articulated shoes constituting a surface of continuous contact with said upper face of said second sheet blank, said upper articulated shoe chain being in facing relation to said lower articulated shoe chain and cooperative with said lower articulated shoe chain for the purpose of feeding said second sheet blank by adherence.

16. Installation according to claim 15, wherein said upper articulated shoe chain travels longitudinally in synchronism with said lower articulated shoe chain.

17. Installation according to claim 13, wherein said means for maintaining said edge to be welded of said first sheet blank on said axis of said laser beam comprise two lateral and parallel guideways disposed on each side of said horizontal reference plane in which said first sheet blanks are fed, each guideway being cooperative, on one side, with a lateral surface of said shoes of said articulated shoe chains and, on the other side, with a vertical reference surface.

18. Installation according to claim 15, wherein said means for producing a lateral pressure between said edges to be welded of said first and second sheet blanks comprise two lateral and parallel guideways disposed on each side of said horizontal reference plane in which said sheet blanks are fed, each guideway being cooperative, on one side, with a lateral surface of said shoes of said articulated shoe chains and, on the other side, with at least one pusher element acting in a direction perpendicular to the butt joint plane of said sheet blanks.

19. Installation according to claim 2, wherein said means for supporting and longitudinally positioning said second sheet blank comprise a second conveyor belt constituting a first surface of continuous contact with a lower face of said second sheet blank, and a lower chain in juxtaposed relation to said second conveyor belt and including articulated shoes constituting a second surface of continuous contact with said lower face of said second sheet blank and moving longitudinally in synchronism with said second conveyor belt, said longitudinal means for supporting said first sheet blank in said second zone and said third zone of said installation comprise a horizontal conveyor belt, constituting a first surface of continuous contact with said lower face of said first sheet blank, in juxtaposed relation to said lower articulated shoe chain of said first zone extending into said second zone and said third zone and constituting a second surface of continuous contact with said lower face of said first sheet blank, said longitudinal means for supporting said second sheet blank in said third zone of said installation comprise a horizontal conveyor belt, constituting a first surface of continuous contact with said lower face of said second sheet blank, in juxtaposed relation to said lower articulated shoe chain of said second zone extending in said third zone and constituting a second surface of continuous contact with said lower face of said second sheet blank, and said longitudinal means for supporting said welded sheet blanks in said fourth zone comprise said conveyor belts and said lower articulated shoe chains of said third zone.

20. Installation according to claim 13, wherein said articulated shoe chains are combined with freely rotatable support rollers cooperative with a surface of said shoes opposite to the surface of said shoes in contact with said sheet blanks, said rollers having axes of rotation which are perpendicular to the longitudinal direction of travel of said articulated shoe chains and horizontal.

21. Installation according to claim 15, wherein said articulated shoe chains are combined with freely rotatable support rollers cooperative with a surface of said shoes opposite to the surface of said shoes in contact with said sheet blanks, said rollers having axes of rotation which are perpendicular to the longitudinal direction of travel of said articulated shoe chains and horizontal.

22. Installation according to claim 11, wherein said conveyor belts and said articulated shoe chain travel longitudinally in synchronism with one another.

23. Installation according to claim 12, wherein said conveyor belts and said articulated shoe chain travel longitudinally in synchronism with one another.

24. Installation according to claim 15, wherein said conveyor belts and said articulated shoe chain travel longitudinally in synchronism with one another.

25. Installation according to claim 2, wherein said means for supporting and longitudinally positioning said second sheet blank comprise a second conveyor belt constituting a first surface of continuous contact with a lower face of said second sheet blank, and a lower chain in juxtaposed relation to said second conveyor belt and including articulated shoes constituting a second surface of continuous contact with said lower face of said second sheet blank and moving longitudinally in synchronism with said second conveyor belt, said conveyor belt and said articulated shoe chain of said means for supporting and longitudinally positioning said first sheet blank, and said conveyor belt and said articulated shoe chain of said means for supporting and longitudinally positioning said second sheet blank being disposed on opposite sides of the butt joint plane of said first and second sheet blanks.

* * * * *